United States Patent [19]

Nakayama et al.

[11] Patent Number: 4,895,983
[45] Date of Patent: Jan. 23, 1990

[54] PROCESS FOR PRODUCING METHYLOL UREA SOLUTION AND PROCESS FOR PRODUCING SLOW-RELEASING NITROGENOUS FERTILIZER USING THE SAME

[75] Inventors: Kiyoshi Nakayama, Yamato; Hiroshi Aoki, Kawasaki; Hisato Saitoh, Yokohama, all of Japan

[73] Assignee: Mitsubishi Chemical Industries Limited, Japan

[21] Appl. No.: 338,444

[22] Filed: Apr. 13, 1989

Related U.S. Application Data

[63] Continuation of Ser. No. 932,653, Nov. 19, 1986, abandoned.

[30] Foreign Application Priority Data

Nov. 21, 1985 [JP] Japan ............... 60-261880

[51] Int. Cl.$^4$ ............... C07B 41/02; C07C 127/15
[52] U.S. Cl. ............... 564/60; 71/29
[58] Field of Search ............... 564/60

[56] References Cited

U.S. PATENT DOCUMENTS

| | | | |
|---|---|---|---|
| 2,321,544 | 6/1943 | Dittmar et al. | 564/60 X |
| 2,467,212 | 4/1949 | Kvalnes | 564/60 |
| 3,649,598 | 3/1972 | Namioka et al. | 260/69 R |
| 4,173,582 | 11/1979 | Greidinger et al. | 71/28 |

FOREIGN PATENT DOCUMENTS 640664  5/1962  Canada ............... 564/60
31345  8/1971  Japan .

OTHER PUBLICATIONS

Chemical Abstracts 39: 178i$^4$ (1945).
Chemical Abstracts 92: 109888w (1980).
Clark et al., Industrial and Engineering Chemistry, 1178–1183, 40, Jul., 1948.

Primary Examiner—Charles F. Warren
Assistant Examiner—Carolyn S. Elmore
Attorney, Agent, or Firm—Jordan B. Bierman

[57] ABSTRACT

A process for producing a methylol urea solution which comprises carrying out addition reaction between urea and formaldehyde in the presence of water and an alkali, wherein said alkali is a polyphosphoric acid salt; and a process for producing a slow-releasing nitrogenous fertilizer which comprises subjecting the resulting methylol urea solution to dehydration condensation and drying the resulting condensate are disclosed. The methylol urea solution undergoes no substantial pH variation with time either during or after the addition reaction, and the fertilizer obtained therefrom is excellent in slow-releasing properties.

20 Claims, 1 Drawing Sheet

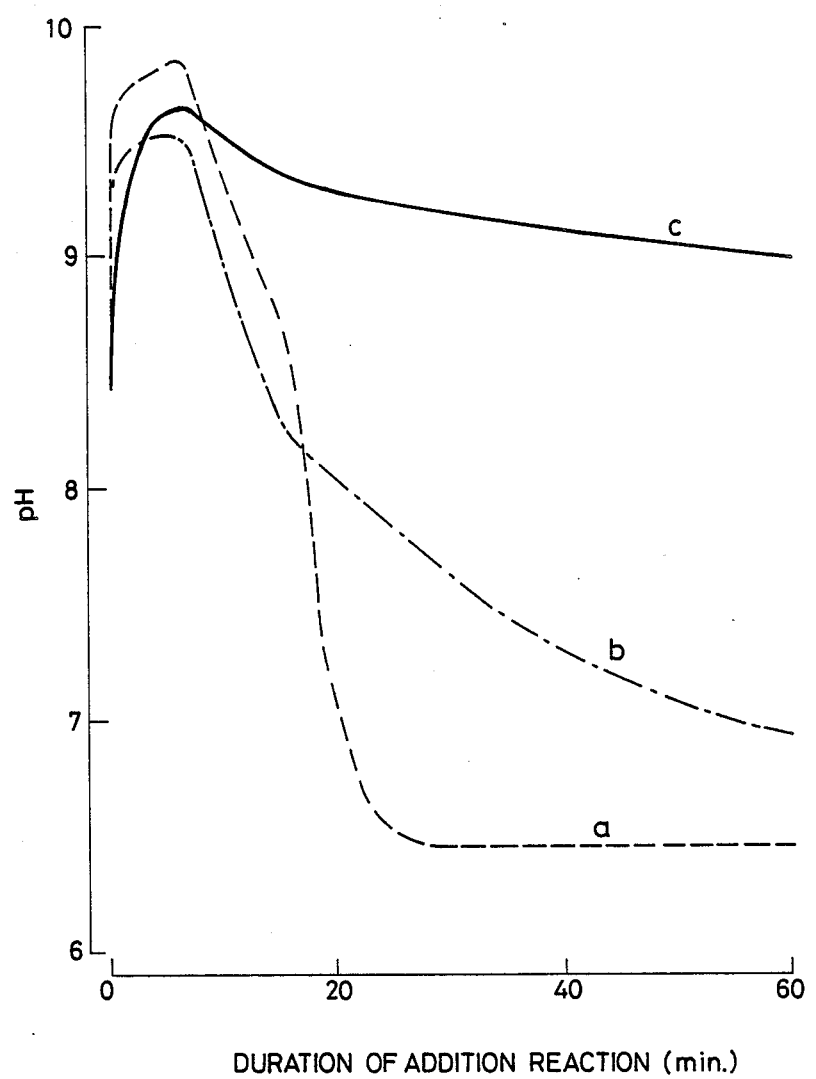

PROCESS FOR PRODUCING METHYLOL UREA SOLUTION AND PROCESS FOR PRODUCING SLOW-RELEASING NITROGENOUS FERTILIZER USING THE SAME

This application is a continuation of application Ser. No. 932,653, filed Nov. 19, 1986.

FIELD OF THE INVENTION

This invention relates to a process for producing a methylol urea solution and a process for producing a slow-releasing nitrogenous fertilizer comprising dehydration condensation of the resulting methylol urea solution. More particularly, this invention relates to a process for producing a methylol urea solution which is prevented from denaturation due to an increase of a methylene compound with time during reaction or preservation after the reaction and to a process for producing a slow-releasing nitrogenous fertilizer, which comprises dehydration condensation of the resulting methylol urea solution.

BACKGROUND OF THE INVENTION

An addition condensation product between urea and an aqueous formaldehyde solution, which is mainly composed of a methylene compound, is widely used as a slow-releasing nitrogenous fertilizer, a molding material for urea resins, and the like, and methylol urea solution is an intermediate product of the addition condensation reaction between urea and aqueous formaldehyde solution.

The addition reaction between urea (either solid urea or an aqueous urea solution) and an aqueous formaldehyde solution is usually carried out by using urea and formaldehyde at a molar ratio of from 1:1 to 1:3 for the production of slow-releasing nitrogenous fertilizers or from 1:0.4 to 1:0.7 for the production of urea resins in the presence of an alkali agent with an initial pH value of the reaction system of from 7 to 10. The reaction is usually effected at a temperature of from 30° C. to 90° C. for a period of from several tens minutes to serveral hours. The resulting methylol urea solution comprising mainly of monomethylol urea and dimethylol urea is then rendered acidic and subjected to dehydration condensation reaction to obtain a condensation product comprising mainly of a methylene compound.

When substrate concentrations in the reaction system are low, for example, when an aqueous urea solution at a low concentration and an aqueous formaldehyde solution is used, the resulting methylol urea solution naturally has a low concentration. In the production of, for example, urea-formaldehyde condensate nitrogenous fertilizers, use of such a low-concentrated methylol urea solution attains a low reaction rate in the dehydration condensation and also requires filtration to separate a condensate and recycling of the mother liquor. In addition, since the thus separated condensate has a water content of about 70% by weight, it should be dried for an extended period of time, which entails a high cost.

On the other hand, when solid urea or a urea solution in a high concentration and aqueous formaldehyde solution are used, since the resulting methylol urea solution has a high concentration, the condensation product preferably obtained therefrom only requires removal of a water content of about 40% by weight by drying without involving complicated operations, such as filtration.

The addition reaction, when conducted under an alkaline condition as described above, is not substantially accompanied by condensation reaction so that monomethylol urea can be produced in high yields. As a result, for the production of slow-releasing nitrogenous fertilizers, the subsequent condensation is easy to control, and the resulting urea-formaldehyde condensate exhibits excellent slow-releasing properties as fertilizer. For the production of urea resins, such high methylol urea yields are advantageous to provide molding materials having satisfactory plasticity.

However, use of a commonly employed alkali agent, such as sodium hydroxide, ammonia, trisodium phosphate, etc., for the pH adjustment in the addition reaction cannot avoid pH reduction of the methylol urea solution with the passage of time during and after the reaction, e.g., during preservation. Such pH reduction is particularly conspicuous in the methylol urea solution prepared from solid urea or a high-concentrated urea solution and an aqueous formaldehyde solution. It is believed that the pH reduction is attributed to air-oxidation of active formaldehyde released from methylol ureas to form formic acid, or to Cannizzaro reaction. If the pH value is lowered to 7.0 or less, dehydration condensation commences to thereby cause white turbidity of the methylol urea liquid due to denaturation. Further progress of the condensation reaction results in precipitation of methylene compounds in the methylol urea solution, which is extremely unfavorable on handling.

Denaturation of the methylol urea solution due to pH reduction might be suppressed by occasional addition of an alkali agent in accordance with the pH reduction or initial addition of a large quantity of an alkali agent. However, the former method needs a complicated procedure, and the latter method unavoidably increases the pH value in the initial stage of the reaction. In particular, if the pH value is 11 or more, the production rate of dimethylol urea becomes so high that dimethylol urea is readily precipitated. Moreover, such a high pH value not only requires a large amount of an acid but also makes pH control difficult for rendering the methylol urea solution acidic to commence dehydration condensation.

The methylol urea solution suffering from denaturation due to pH reduction is difficult to handle, and also a urea-formaldehyde condensate obtained therefrom is inferior in slow-releasing properties as a fertilizer.

In general, effectiveness of nitrogenous fertilizers in chemical analysis is evaluated by quantitatively analyzing a total nitrogen (TN), a cold water-soluble nitrogen (WSN), a cold water-insoluble nitrogen (WIN), a hot buffer-insoluble nitrogen (HWIN), in accordance with the A.O.A.C. method (Association of Official Analytical Chemists) and calculating an AI value (i.e., aa ratio of a cold water-insoluble and hot buffer-soluble nitrogen to a cold water-insoluble nitrogen) through the following formula.

$$AI = \frac{WIN - HWIN}{WIN} \times 100 = \frac{TN - WSN - HWIN}{TN - WSN} \times 100$$

Among urea-formaldehyde condensates, methylene urea having a low degree of condensation is generally soluble in water or a hot buffer solution and is effectively absorbed into plants as a nitrogen source, but the water-soluble methylene urea shows a relatively high rate of decomposition into inorganic nitrogen (mineralization) and is not, therefore, suitable as a slow-releasing fertilizer. On the other hand, highly condensed methylene urea that is insoluble even in a hot buffer solution has an extremely low rate of decomposition into inorganic nitrogen after fertilization and is hardly utilized by plants.

Accordingly, it has been desired that highly effective and slow-releasing nitrogenous fertilizers should have a low WSN content, a high WIN content, and a low HWIN content, i.e., a high AI value with a high WIN content.

However, when methylol urea solution obtained by conventional processes are subjected to dehydration condensation reaction under an acidic condition to prepare urea-formaldehyde condensate nitrogenous fertilizers, there is a general tendency that an increase of a WIN content is attended by an increase of an HWIN content, thus abruptly decreasing the AI value. That is, it has been very difficult to obtain slow-releasing urea-formaldehyde fertilizers having a high AI value as well as a high WIN content.

SUMMARY OF THE INVENTION

One object of this invention is to provide a process for producing a stable methylol urea solution which undergoes no substantial pH variation during reaction or preservation after the reaction and is, therefore, free from an increase of a methylene compound with time.

Another object of this invention is to provide a process for producing a urea-formaldehyde nitrogenous fertilizer excellent in slow-releasing properties by subjecting the above-described stable methylol urea solution to dehydration condensation.

As a result of extensive investigations, it has now been found that the above objects can be achieved by using a polyphosphoric acid salt as an alkali agent in the addition reaction between urea and formaldehyde for the production of the methylol urea solution.

That is, the present invention relates to a process for producing a methylol urea solution which comprises addition reaction between urea and formaldehyde in the presence of water and an alkali, wherein said alkali is a polyphosphoric acid salt.

The present invention also relates to a process for producing a slow-releasing nitrogenous fertilizer which comprises carrying out addition reaction between urea and formaldehyde in the presence of water and an alkali to prepare a methylol urea solution, carrying out dehydration condensation of the resulting methylol urea solution, and drying the resulting condensate, wherein said alkali is a polyphosphoric acid salt.

BRIEF DESCRIPTION OF THE ACCOMPANYING DRAWING

The FIGURE shows pH variations with time during the addition reaction between urea and formaldehyde. In the figure, the dotted lines a and the dot-and-dash lines b indicate comparisons, and the solid line c indicates the invention.

DETAILED DESCRIPTION OF THE INVENTION

In the formation reaction of methylol urea solution according to the present invention, formaldehyde is usually used as an aqueous solution in any arbitrary concentration, but, preferably, in concentrations of 35% by weight or higher. The aqueous formaldehyde solution may contain a small proportion of methanol.

Urea to be used is usually in the form of solid. Solutions of urea in water or alcohols, e.g., methanol, etc., in high concentrations may also be employed.

A molar ratio of urea to formaldehyde is appropriately selected depending on the end use of the resulting methylol urea solution and, usually, ranges from about 1:0.4 to about 1:3. More specifically, when it is intended to produce a urea-formaldehyde condensate nitrogenous fertilizer from the methylol urea solution, the urea to formaldehyde molar ratio is usually from about 1 to about 2, and preferably from 1.1 to 1.6.

Water to be present in the reaction system may be in any amount larger than those introduced in the form of an aqueous formaldehyde solution, with its amount being not particularly limited. According to the present invention, even when the substrate concentrations in the reaction system are high, a stable methylol urea solution can be obtained. However, in the preparation of a methylol urea solution to be used as a material for fertilizers, a molar ratio of urea:formaldehyde:water is usually about 1 to 2:1:1.3 to 4.5, and preferably 1.1 to 1.6:1:1.5 to 3.

In the present invention, the above-described addition reaction between urea and an aqueous formaldehyde solution is carried out in the presence of a polyphosphoric acid salt as an alkali. The polyphosphoric acid salts to be used include alkali metal salts of polyphosphoric acids of various degrees of condensation, preferably alkali metal salts of pyrophosphoric acid, tripolyphosphoric acid, etc. These polyphosphates may be used singly or in combination. Of these, a sodium or potassium salt of tripolyphosphoric acid or pyrophosphoric acid is particularly preferred. These polyphosphates may be used in the form either of crystals or a solution in a solvent, e.g., water, etc. The polyphosphate is added in such an amount as to adjust the reaction system usually to a pH of from 7 to 10. In the particular preparation of a methylol urea solution to be used as a material for slow-releasing nitrogenous fertilizers, the reaction system pH is preferably adjusted to a range of from 7.5 to 10, more preferably from 8 to 10. In general, the amount of polyphosphate to be added is appropriately selected from a range of from 0.5 to 9% by weight based on the formaldehyde. The method for adding the polyphosphate is not particularly restricted and includes dependent addition, incorporating addition with urea, and the like. It is usual that the polyphosphate is added to an aqueous formaldehyde solution to make it alkaline and urea is then dissolved therein. The reaction is usually carried out at a temperature of from room temperature up to 100° C., preferably from room temperature to about 80° C., more preferably from about 40° to about 80° C., and most preferably from 40° to 60° C., for a period of not less than 15 minutes, and preferably of from about 30 to about 60 minutes.

According to the present invention, use of the polyphosphoric acid salt as an alkali makes it possible to inhibit pH variations of the reaction system both during and after the reaction even with high substrate concentrations of the reaction system. For example, the resulting reaction mixture can be maintained at a pH of 7.0 or more even when left to stand for one week. Therefore, the methylol urea solution obtained by the process of this invention can be prevented from formation of condensates not only during reaction but during preservation, and thus, can be maintained transparent for a prolonged period of time so that a composition of the methylol urea solution may be stabilized.

According to the present invention, urea-formaldehyde condensate nitrogenous fertilizers excellent in slow-releasing properties can be produced by subjecting the methylol urea solution thus obtained to dehydration condensation.

The methylol urea solution obtained by the present invention usually contains unreacted urea and aldehyde, but can be subjected to dehydration condensation without requiring any special working-up procedure. If desired, additional amounts of urea and/or formaldehyde may be added to the methylol urea solution. Taking consideration of slow-releasing properties of the resulting fertilizer, a molar ratio of urea to formaldehyde in the methylol urea solution to be subjected to dehydration condensation preferably ranges from 1 to 2, and more preferably from 1.1 to 1.6. In this case, a molar ratio of urea: formaldehyde:water is preferably 1 to 2:1:1.3 to 4.5, and more preferably 1.1 to 1.6:1:1.5 to 3.

The dehydration condensation reaction can be effected by lowering the pH value of the methylol urea solution to a range of from 3 to 7, and preferably of from 4 to 7. The pH adjustors to be used include various acids, usually embracing inorganic acids, such as sulfuric acid, phosphoric acid, etc., and organic acids, such as tartaric acid, citric acid, etc. These pH adjusters may be used singly or in combination. Of these acids, use of phosphoric acid or citric acid is particularly effective to suppress a pH variation during the condensation reaction.

The amount of the pH adjustor to be used is not particularly restricted as far as the pH of the methylol urea solution may fall within the above-recited range. The pH adjustor may be added to the methylol urea solution in any manner, but, usually added in the form of a solution under stirring.

The temperature and duration of the dehydration condensation reaction and the temperature and time for drying of the resulting condensate vary depending on the degree of condensation of the desired condensate. It should be noted, however, that a urea-formaldehyde condensate having a high degree of condensation is unfavorable as a slow-releasing fertilizer due to insolubility even in a hot buffer solution. From this viewpoint, conditions for obtaining urea-formaldehyde condensate nitrogenous fertilizers having satisfactory slow-releasing properties should be set between room temperature and about 120° C., and preferably between about 40° C. and about 110° C., in reaction temperature; and at least 5 minutes, and preferably between about 10 minutes to about 2 hours in reaction time. The resulting condensate is dried usually at a temperature of from about 60° C. to about 300° C., and preferably from about 80° C. to about 250° C., for a period appropriately selected depending on the degree of condensation and the water content of the desired product. Usually, the drying is continued until the water content is reduced to 8% by weight or less.

According to the process for producing the slow-releasing nitrogenous fertilizers of this invention, wherein the methylol urea solution prepared by using a polyphosphoric acid salt as an alkali is subjected to dehydration condensation, urea-formaldehyde condensates having an increased cold water-insoluble nitrogen content and a heightened AI value can be obtained as described above. More specifically, the urea-formaldehyde condensate nitrogenous fertilizer produced by the process of this invention has a urea to formaldehyde molar ratio of from 1 to 2, and preferably from 1.1 to 1.6, a TN content of from 35 to 40%, a WIN content of from 12 to 28%, and preferably from 16 to 28%, a WIN/TN ratio of from 30 to 80%, and preferably from 40 to 80%, as determined according to the A.O.A.C. method, and an AI value of from 40 to 80, and preferably from 50 to 80. These values are duly indicative of the superiority of the nitrogenous fertilizers of the present invention in terms of slow releasing properties.

This invention will now be illustrated in greater detail with reference to the following examples, but it should be understood that they are not intended to limit the present invention. In these examples, all the percents are given by weight unless otherwise indicated.

EXAMPLE 1

In 200 g of 37% aqueous formaldehyde solution heated to 50° C. in a hot water bath, 1.4 g of sodium tripolyphosphate ($Na_3P_3O_{10}$) was dissolved to adjust to a pH of about 8.6. To the solution was added 222 g of crystalline urea (corresponding to 1.5 mol per mol of formaldehyde) to effect addition reaction. In 15 minutes and 30 minutes from the beginning of the reaction, 95% and 98% or more, respectively, of the formaldehyde was reacted to produce a methylol urea solution. A pH change of the reaction system with time during the reaction is shown as Solid Line c in the FIGURE.

As can be seen from the FIGURE, the pH value of the reaction system reached the maximum of about 9.7 after about 8 minutes from the urea addition and then dropped but at such a very small rate of fall that it was still 9.0 after 60 minutes. Though not shown in the FIGURE, the subsequent pH fall was also at a small rate, and the pH value after 360 minutes was 7.5. When the resulting methylol urea solution was allowed to stand at room temperature for one week, no further substantial variation in pH was observed.

COMPARATIVE EXAMPLE 1

A methylol urea solution was produced in the same manner as described in Example 1 except for using 0.44 g of a 10% aqueous solution of sodium hydroxide to adjust the formaldehyde solution to a pH of about 8.6. A pH change of the reaction system with time is shown as Dotted Line a in the FIGURE. In this example, the pH value of the reaction system once reached the maximum of about 9.9 in about 6 minutes from the urea addition and then drastically dropped to 8.8 within 15 minutes and to 6.5 within 30 minutes from the urea addition. When the resulting methylol urea liquid was allowed to stand at 35° C. for one day, no substantial variation in pH was observed.

COMPARATIVE EXAMPLE 2

A methylol urea solution was produced in the same manner as in Example 1 except for using 0.25 g of trisodium phosphate ($Na_3PO_4.12H_2O$) as an alkali to adjust the aqueous formaldehyde solution to a pH of about 8.6. A pH change of the reaction system with time is shown as Dot-and-Dash Line b in the FIGURE. In this example, the pH value of the reaction system once rose up to the maximum of about 9.5 after about 6 minutes from the urea addition and then dropped to 8.3, 7.7 and below 7 after 15, 30, and 60 minutes from the urea addition, respectively. When the resulting methylol urea liquid was allowed to stand at 35° C. for one day, a slight pH reduction was observed.

EXAMPLES 2 AND 3

A methylol urea solution was produced in the same manner as in Example 1 except for replacing the sodium tripolyphosphate with 1.4 g of sodium pyrophosphate ($Na_4P_2O_7 \cdot 10H_2O$) or potassium tripolyphosphate.

In the case of using sodium pyrophosphate, the aqueous formaldehyde solution was ajusted to a pH of 8.7. After the urea addition, the pH of the reaction system reached the maximum of 9.9 and was then reduced at such a small rate of fall that it was 9.1 after 60 minutes.

In the case of using potassium tripolyphosphate, the aqueous formaldehydesolution was adjusted to a pH of 8.0. After the urea addition, the pH of the reaction system reached the maximum of 9.3 and was then reduced at such a small rate of fall that it was 8.3 after 60 minutes.

When each of the resulting methylol urea solutions after 60 minutes was further allowed to stand at room temperature for one day, the rate of pH fall was extremely small in each case.

EXAMPLES 4 AND 5

A methylol urea solution was produced in the same manner as in Example 1 except for changing the urea to formaldehyde molar ratio to 2.5 or 0.50. In the former case, the pH value of the reaction system was 9.7 and 9.3 after 30 minutes and 60 minutes from the urea addition, respectivelY. In the latter case, it was 8.8 after 30 minutes and 8.7 after 60 minutes. Thereafter, each of the resulting methylol urea solutions was allowed to stand at room temperature for one day, but the rate of pH fall observed was extremely small in either case.

EXAMPLE 6

To 122 g of 37% aqueous formaldehyde solution heated at 50° C in a hot water bath, 2.2 g of sodium tripolyphosphate was added as an alkali and dissolved therein. The resulting solution had a pH of 8.3. To the solution was added 135 g (corresponding to 1.5 mol per mol of formaldehyde) of crystalline urea to effect addition reaction for a period of 60 minutes. The resulting methylol urea liquid had a pH of 9.2.

An aqueous solution containing 4 mols of phosphoric acid was then added to the methylol urea liquid to adjust to a pH of 5.0, and dehydration condensation was carried out for 60 minutes. The reaction mixture was dried at 80° C. for 4 hours to obtain a product. The results of the analysis are shown in Table 1 below.

COMPARATIVE EXAMPLE 3

A methylol urea liquid was produced in the same manner as described in Example 6 except for replacing the sodium tripolyphosphate with 0.28 g of a 10% aqueous sodium hydroxide solution to adjust the aqueous formaldehyde solution to a pH of 8.8. The resulting methylol urea liquid had a pH of 6.6.

The methylol urea liquid was adjusted to a pH of 5.0 with a phosphoric acid aqueous solution to effect dehydration condensation for 60 minutes, followed by drying at 80° C. for 5 hours to obtain a product. The results of the analysis are shown in Table 1 below

EXAMPLE 7

To 140 g of 37% aqueous formaldehyde solution heated at 50° C. in a hot water bath, 2.5 g of sodium tripolyphosphate was added as an alkali and dissolved therein. The resulting solution had a pH of 8.4. To the solution was added 135 g (corresponding to 11.3 mol per mol of formaldehyde) of crystalline urea, and addition reaction was conducted for 60 minutes. The resulting methylol urea solution had a pH of 9.2.

The methylol urea solution was adjusted to a pH of 5.0 with an aqueous solution containing 4 mols of phosphoric acid, and dehydration condensation reaction was continued for 60 minutes. The reaction mixture was then dried at 80° C. for 4 hours to obtain a product.

The results of the analysis are shown in Table 1 below.

COMPARATIVE EXAMPLE 4

A methylol urea solution was produced in the same manner as in Example 7 except for replacing the sodium tripolyphosphate with 0.31 g of a 10% aqueous sodium hydroxide solution to adjust the formaldehyde solution to a pH of 8.6. The resulting metylol urea solution had a pH of 6.4.

The methylol urea solution was then adjusted to a pH of 4.0 with an aqueous solution containing 4 mols of phosphoric acid, subjected to dehydration condensation of Example 8 for 60 minutes, and dried at 80° C. for 4 hours to obtain a product.

Each of the condensation products obtained in Examples 6 and 7 and Comparative Examples 3 and 4 was analyzed in accordance with the A.O.A.C. method to determine various nitrogen contents and the AI value. The results obtained are shown in Table 1.

TABLE 1

|  | TN (%) | WSN (%) | WIN (%) | HWIN (%) | WIN-* HWIN (%) | AI Value |
|---|---|---|---|---|---|---|
| Example 6 | 38.9 | 21.1 | 17.8 | 5.3 | 12.5 | 70.2 |
| Comparative Example 3 | 38.9 | 27.2 | 11.7 | 3.9 | 7.8 | 66.7 |
| Example 7 | 37.4 | 12.9 | 24.5 | 8.8 | 15.7 | 64.1 |
| Comparative Example 4 | 37.7 | 14.1 | 23.6 | 14.4 | 9.2 | 39.0 |

*WIN-HWIN: a cold water-insoluble and hot buffer-soluble nitrogen

The following considerations can be derived from the results of Table 1 above.

With a urea to formaldehyde molar ratio and a pH value at the commencement of dehdyration condensation being the same, the urea-formaldehyde condensate nitrogenous fertilizer produced from the methylol urea solution obtained by using a polyphosphate as an alkali (Example 6) has a higher WIN content and a higher AI value indicative of excellent slow-releasing properties as compared with that produced from the methylol urea solution obtained using a conventional alkali agent (Comparative Example 3).

Further, with a urea to formaldehyde molar ratio being the same and a pH value at the commencement of dehydration condensation being varied so as to produce final products having substantially the same WIN content, the urea-fomaldehyde condensate nitrogenous fertilizer produced from the methylol urea solution obtained by using a polyphosphate as an alkali (Example 7) has a higher AI value which is an indication of superior slow-releasing properties, when compared with that produced from the methylol urea solution obtained by using a conventional alkali agent (Comparative Example 4).

While the invention has been described in detail and with reference to specific embodiments thereof, it will be apparent to one skilled in the art that various changes and modifications can be made therein without departing from the spirit and scope thereof.

What is claimed is:

1. A process for producing a methylol urea solution which comprises an addition reaction between urea and formaldehyde in the presence of water and at least one alikali selected from the group consisting of alkali metal salts of pyrophosphoric acid and tripolyphosphoric acid, wherein the addition reaction is carried out at a temperature in the range of room temperature to 100° C. and at a pH of from 7 to 10, using 0.4 to 3moles of the urea to 1 mole of the formaldehyde in the presence of 0.5 to 9%, by weight based on the formaldehyde, of said alkali.

2. A process as in claim 1 wherein said alkali is selected from the group consisting of sodium pyrophosphate, potassium pyrophosphate, sodium tripolyphosphate, and potassium tripolyphosphate.

3. A process as in claim 1, wherein said addition reaction is carried out at a pH of from 8 to 10.

4. A process as in claim 1, wherein said addition reaction is carried out at a temperature of from 40° C. to 80° C.

5. A process as in claim 1, wherein a solid urea, an aqueous formaldehyde solution, and at least one kind of alkali selected from the group consisting of sodium pyrophosphate, potassium pyrophasphate, sodium tripolyphosphate, and potassium tripolyphosphate, are used at pH of from 7 to 10.

6. A process for producing a slow-releasing nitrogenous fertilizer which comprises an addition reaction between urea and formaldehyde in the presence of water and at least one alkali selected from the group consisting of alkali m etal salts of pyrophosphoric acid and tripolyphosphoric acid to prepare a methylol urea solution, carrying out a dehydration condensation of the resulting methylol urea solution and drying the resulting condensate, wherein the addition reaction is carried out at a temperature in the range of room tem,perature to 100° C. and at a pH of from 7 to 10 using 0.4 to 3 moles of the urea to 1 mole of the formaldehyde in the presence of 0.5 to 9% by weight, based on the formaldehyde, of said alkali.

7. A process as in claim 3, wherein said polyphosphoric acid salt is selected from the group consisting of sodium pyrophosphate, potassium pyrophosphate, sodium tripolyphosphate, and potassium tripolyphosphate.

8. A process as in claim 3, wherein said urea is solid urea and said formaldehyde is an aqueous formaldehyde solution.

9. A process as in claim 6, wherein a molar ratio of urea, formaldehyde, and water is 1 to 2:1:1.3 to 4.5.

10. A process as in claim 9, wherein a molar ratio of urea, formaldehyde, and water is 1.1 to 1.6:1:1.5 to 3.

11. A process as in claim 6, wherein said addition reaction is carried out at a pH of from 8 to 10.

12. A process as in claim 6, wherein said addition reaction is carried out at a temperature of from 40° C. to 80° C.

13. A process as in claim 6, wherein said dehydration condensation is carried out in the presence of at least one of a phosphoric acid and citric acid.

14. A process as in claim 6, wherein said dehydration condensation is carried out at a pH of from 3 to 7.

15. A process as in claim 14, wherein said dehydration condensation is carried out at a pH of from 4 to 7.

16. A process as in claim 6, wherein said dehydration condensation is carried out at a temperature of from room temperature to 120° C.

17. A process as in claim 16, wherein said dehydration condensation is carried out at a temperature of from 40° C. to 110° C.

18. A process as in claim 6, wherein said drying is carried out at a temperature of from 60° C. to 300° C.

19. A process as in claim 18, wherein said drying is carried out at a temperature of from 80° C. to 250° C.

20. A process as in claim 6, wherein a solid urea and an aqueous formaldehyde solution are used in a molar ratio of urea, formaldehyde and water being 1 to 2:1:1.3 to 4.5, in the presence of at least one alkali selected from the group consisting of sodium pyrophosphate, potassium pyrophospahte, sodium tripolyphosphate, and potassium tripolyphosphate, at a pH of from 7.5 to 10 to form methylol urea solution, and the resulting methylol urea is condensed in the presence of at least one of phosphoric acid and citric acid, at a pH of from 3 to 7.

* * * * *